US012267601B2

(12) United States Patent
Wang

(10) Patent No.: US 12,267,601 B2
(45) Date of Patent: Apr. 1, 2025

(54) LENS FLARE DETECTION CIRCUIT USING RAW IMAGE

(71) Applicant: Apple Inc., Cupertino, CA (US)

(72) Inventor: Muge Wang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/114,602

(22) Filed: Feb. 27, 2023

(65) Prior Publication Data

US 2024/0292114 A1    Aug. 29, 2024

(51) Int. Cl.
*H04N 23/71* (2023.01)
*H04N 23/76* (2023.01)
*H04N 23/88* (2023.01)
*H04N 25/61* (2023.01)
*H04N 25/703* (2023.01)

(52) U.S. Cl.
CPC ............ *H04N 23/88* (2023.01); *H04N 23/71* (2023.01); *H04N 23/76* (2023.01); *H04N 25/703* (2023.01); *H04N 25/61* (2023.01)

(58) Field of Classification Search
CPC ........ H04N 23/71; H04N 23/83; H04N 23/84; H04N 25/61
USPC ........................................................ 348/241
See application file for complete search history.

(56) References Cited

U.S. PATENT DOCUMENTS

| 6,040,858 | A | * | 3/2000 | Ikeda | H04N 23/70 |
| | | | | | 348/242 |
| 10,382,712 | B1 | * | 8/2019 | Forutanpour | G06T 5/90 |
| 11,783,450 | B2 | * | 10/2023 | Pan | G06T 5/00 |
| | | | | | 382/162 |
| 2011/0242352 | A1 | * | 10/2011 | Hikosaka | H04N 25/61 |
| | | | | | 348/222.1 |
| 2017/0070689 | A1 | * | 3/2017 | Silverstein | H04N 25/61 |
| 2023/0396883 | A1 | * | 12/2023 | Kamal | H04N 23/683 |

FOREIGN PATENT DOCUMENTS

| CN | 110047052 | A | * | 7/2019 | ............... G06T 5/00 |
| CN | 112419161 | B | | 7/2022 | |
| CN | 115170554 | A | | 10/2022 | |
| CN | 110944160 | B | | 11/2022 | |
| WO | WO 2020/187220 | A1 | | 9/2020 | |

* cited by examiner

*Primary Examiner* — Anthony J Daniels
(74) *Attorney, Agent, or Firm* — Sterne, Kessler, Goldstein & Fox P.L.L.C

(57) ABSTRACT

Embodiments relate to identifying locations in an image where a green ghost is likely to occur by processing a raw version of the image. A block of pixels in the raw image is extracted and then each pixel value in the block is compared with a threshold value of a corresponding color channel. The compared results are then processed to generate bright light information for the block, indicating whether the green ghost is likely to be present at a location of the image diagonally opposed to the location of the block in the image relative to an optical center of an image sensor. By processing the raw image without subsequent processing prone to introducing artifacts and creating false positive, a likely location of the green orb or green ghost may be more accurately identified.

20 Claims, 7 Drawing Sheets

LENS FLARE DETECTION CIRCUIT USING RAW IMAGE

BACKGROUND

1. Field of the Disclosure

The present disclosure relates to a circuit for processing images, and more specifically to detecting likely locations of lens flares such as a green ghost in an image.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Lens flare refers to the phenomenon of light reflecting on a camera lens, including lens cover and image sensor, resulting in a bright, often circular, spot in an image. The lens flare is caused by bright light entering the camera optical path and interacting with the cover window, lens elements and/or image sensor, resulting in reflected light being recorded on the camera's sensor. One of the image processing algorithms that may be performed on the image is detecting or predicting the locations where the lens flares are likely to be present based on the locations of the bright light.

SUMMARY

Embodiments relate to detecting lens flares by processing a raw image by an image processing circuit. The image processing circuit includes a threshold circuit and a logic circuit. The threshold circuit receives a block of pixels in the raw image format with a plurality of mosaiced color channels. The raw image format includes a plurality of blocks of pixels including the block of pixels. The threshold circuit compares values of the pixels with corresponding threshold values for color channels of the pixels to generate comparison results. The logic circuit generate bright light information by processing the comparison results. The bright light information indicates whether a lens flare is likely to be present at a location of an image related to the location of the bright light.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to identifying locations in an image where a green ghost is likely to occur by processing a raw version of the image. A block of pixels in the raw image is extracted and then each pixel value in the block is compared with a threshold value of a corresponding color channel. The compared results are then processed to generate bright light information for the block, indicating whether the green ghost is likely to be present at a location of the image diagonally opposed to the location of the block in the image relative to an optical center of an image sensor. By processing the raw image without subsequent processing prone to introducing artifacts or false positive, a likely location of the green orb or green ghost may be more accurately identified. Further, the bright light information for the block may be a single bit, reducing size of the storage for storing the bright light information and reducing the complexity of subsequent processing to address the green ghost.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
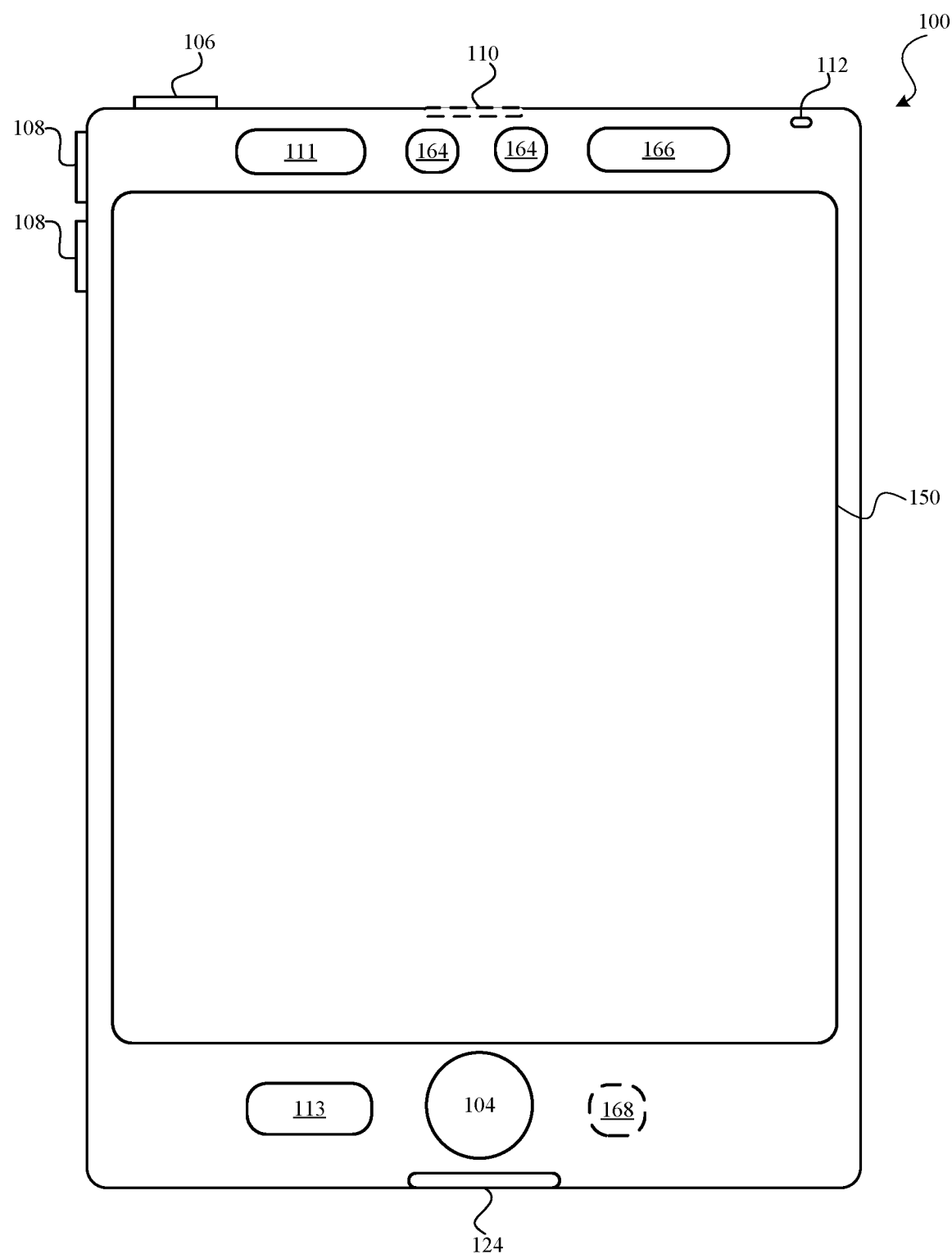
FIG. 1 is a high-level diagram of an electronic device, according to one embodiment.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
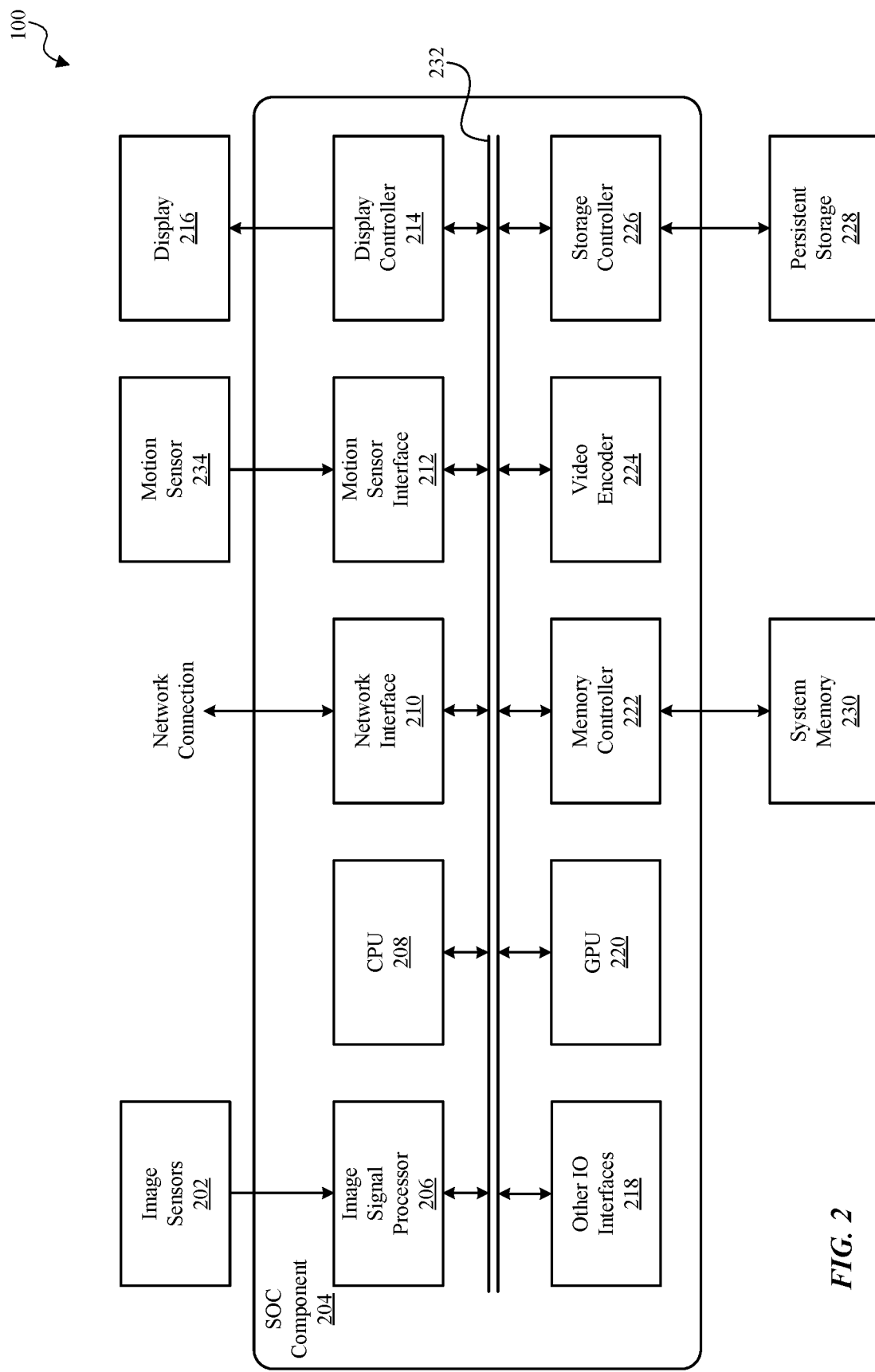
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 216 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
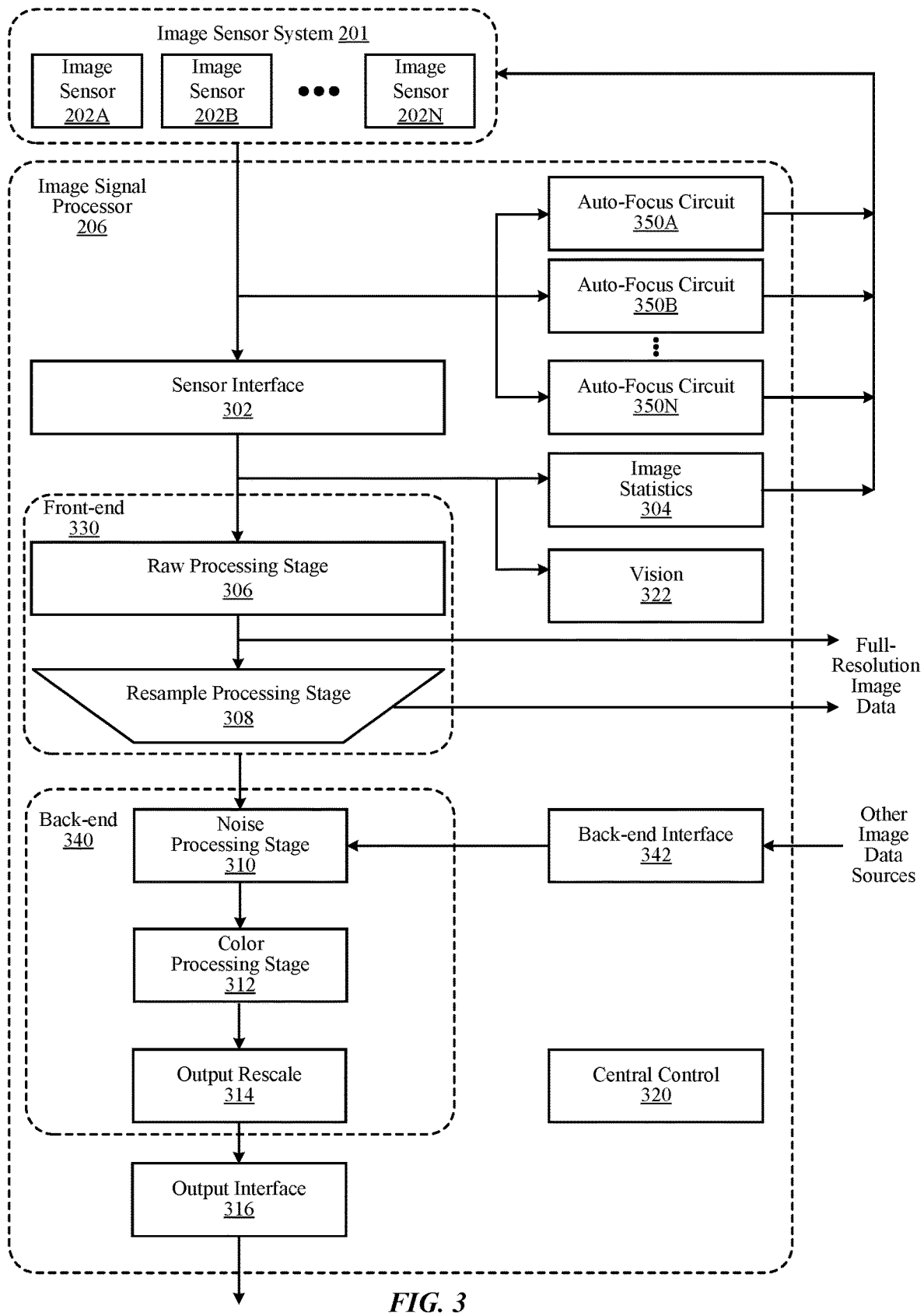
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control module 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale module 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include a hardware circuit that analyzes raw image data to determine an appropriate lens position of each image sensor 202. In one embodiment, the raw image data may include data that is transmitted from image sensing pixels that specialize in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics module 304 to determine information regarding auto-exposure.

The auto-focus circuits 350 may be individual circuits that are separate from other components such as image statistics module 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamlessly transition from image data captured by one image sensor 202 to image data captured by another image sensor 202 without waiting for the second image sensor 202 to adjust its lens position because two or more auto-focus circuits 350 may continuously provide auto-focus data to the image sensor system 201.

Raw image data captured by different image sensors 202 may also be transmitted to a sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a drop-off in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, inverse black level compensation, white balancing compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistical data when preceding operations identify clipped pixels. Although only a single statistics module 304 is illustrated in FIG. 3, multiple image statistics modules may be included in ISP 206. For example, each image sensor 202 may correspond to an individual image statistics module 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCbCr format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of an image and a kernel.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Backend pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial noise filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional input coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement a series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute a set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between input image data and output image data in order to correct artifacts and motion caused by sensor motion during the capture of the image frame. Output rescale may provide image data via the output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Green Ghost Detection Circuit

A green orb or green ghost (hereinafter referred to as "green ghost") is a subcategory of lens flares caused by light scattering within the optical elements and image sensor. The green color is typically caused by spectral properties of the coating and image sensor. Although predominantly green color is present in these types of lens flares, the artifacts can also appear as other colors. Such green ghost may add undesirable artifacts in the image.

Figure 4:
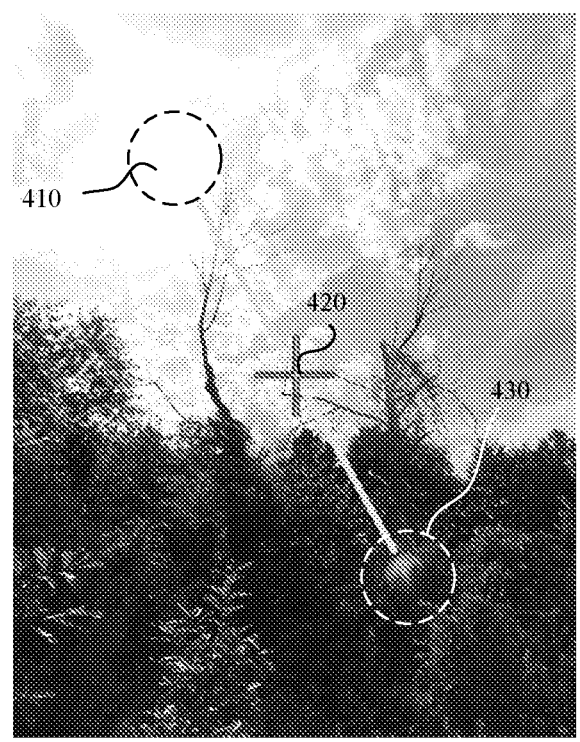
FIG. 4 is an example image illustrating a green orb or a green ghost, according to one embodiment.

FIG. 4 is an example image illustrating a green orb or a green ghost (hereinafter referred to as "green ghost"), according to one embodiment. A green ghost typically occurs at a location in an image that is diagonally opposite to a location of a bright spot in the image relative to an optical center of a lens in an image sensor capturing the image. In FIG. 4, a green ghost caused by a bright region 410 of the image representing a bright spot of a sun appears in a region 430 that is generally diagonal and equidistance from bright region 410 relative to optical center 420 of the image sensor. Hence, by detecting regions in an image with their pixel values above certain thresholds, likely locations of the green ghosts may be estimated.

Figure 5:
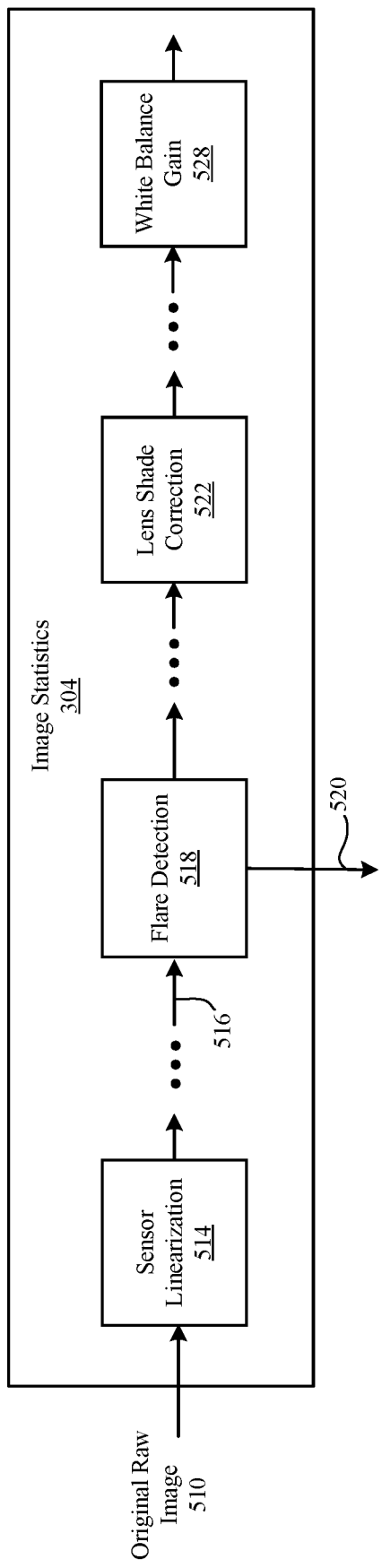
FIG. 5 is a block diagram of an image statistics circuit, according to one embodiment.

FIG. 5 is a block diagram of image statistics circuit module 304 that performs various operations to collect information associated with the image data, according to one embodiment. For this purpose, image statistics module 304 may include, among other components, sensor linearization circuit 514, flare detection circuit 518, lens shade correction circuit 522 and white balance gain circuit 528. Image statistics circuit 304 may be embodied as circuits with discrete processing circuits for dedicated operations or may be embodied as a general purpose circuit that performs various different operations.

Sensor linearization circuit 514 maps non-linear output from image sensor 202 to linear output for further processing at image statistics module 304. Sensor linearization circuit 514 may implement mapping of raw pixel values in original raw image 510 from image sensor 202 to adjusted raw pixel values in original raw image 510 by using a lookup table (LUT). In one or more embodiments, sensor linearization circuit 514 uses a single component LUT for Gr, R, B and Gb to generate the adjusted pixel values. Original raw image 510 may be, for example, in a Bayer image format or a Quadra Bayer format.

Flare detection circuit 518 is a circuit that detects bright spots and generates bright light information 520 by further processing a processed version 516 of raw image. The processed version 516 of raw image is an image in raw format that is generated by processing original raw image 510 through one or more of sensor linearization, defect pixel replacement, and decimation of pixels. The processed version 516 of raw image has yet to undergo other processing such as lens shade correction or white balancing compensation since these operations may introduce artifacts and distortions that may negatively affect accurate detection of the bright spots. Bright light information 520 indicates whether a lens flare is likely to be present at one or more locations of an image obtained by processing original raw image 510.

Flair information 520 may be used by other components of ISP 206 or software executed by CPU 208 to remove or reduce the green ghost that would otherwise appear in the processed image data. By indicating the likely locations of the green ghost to the other components of ISP 206 or the software, the operation to remove the green ghost may be performed on a selective portion of the image data, and therefore, reduce the overall use of power and computing resources.

Lens shade correction circuit 522 is a circuit that performs lens shade correction by applying a gain to each pixel or a group of pixels to compensate for a dropoff in light intensity as a distance of the pixel or the group of pixels from an optical center of the lens increases. In one or more embodiments, the gain for the pixel or the group of pixels is obtained by interpolating gain values specified in a two-dimensional grid of gains per color channel (Gr, R, B, Gb).

White balance gain circuit 528 is a circuit that adjusts pixel values in the raw image to adjust colors in the image data so that colors of a captured scene can be accurately represented. White balance gain circuit 528 may offset a pixel value by one value, multiply the offset value by a gain value, and then offset the multiplied by another value. The offset and multiplication values are color channel dependent. The last offset value may be clipped to a predetermined range to obtain the white balance gain adjusted pixel values in white balance gain circuit 528.

Image statistics module 304 illustrated in FIG. 5 is merely an example. Various additional circuits may be added to image statistics module 304 and some circuits shown in FIG. 5 may be removed from image statistics module 304. Image statistics module 304 receives original raw image 510 early in the pipeline of ISP 206, and hence, bright light information 520 may be made available to circuits in front-end pipeline stages 330, back-end pipeline stages 340 or software executed by CPU 208 for subsequent processing of the raw image.

Figure 6:
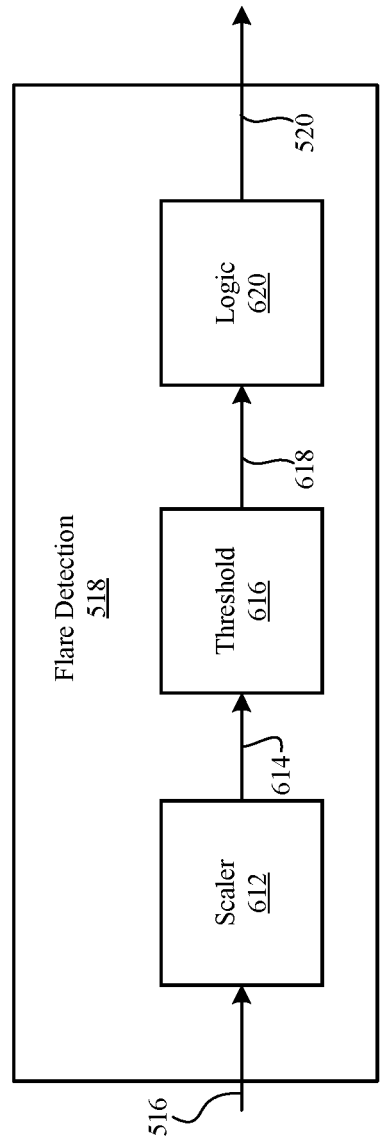
FIG. 6 is a block diagram of a flare detection circuit according to one embodiment.

FIG. 6 is a block diagram of flare detection circuit 518, according to one embodiment. Flare detection circuit 518 identifies bright spots in processed version 516 of the image by detecting pixel values of color channels that exceed respective threshold levels. For this purpose, flare detection circuit 518 may include, for example, scaler circuit 612, threshold circuit 616, and determination logic 620.

Scaler circuit 612 is a circuit that downscales processed version 516 of the raw image to generate downscaled raw image 614 for further processing. The downscale may be performed in various ways, including, but not limited to, decimating certain pixels in a block of pixels, averaging pixel values for pixels of the same color channel in a block, or taking a minimum or maximum pixel value of a pixel block. By downscaling the raw image, computing of subsequent processing to be performed by threshold circuit 616 and/or determination logic 620 and power consumption may be reduced. The scaler circuit 612 may be bypassed in one or more embodiments so that processed version 516 of raw image is provided directly to threshold circuit 616.

Figure 7:
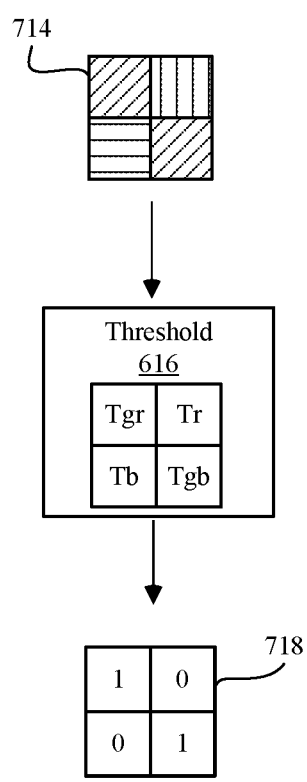
FIG. 7 is a conceptual diagram illustrating generation of comparison results, according to one embodiment.

Threshold circuit 616 determines whether a pixel value of downscaled raw image 614 exceeds a threshold value. The threshold value may be set per color channel (Gb, Gr, R, B) or be identical across different color channels. FIG. 7 is a conceptual diagram illustrating operation at threshold circuit 616, according to one embodiment. In the example of FIG. 7, threshold circuit 616 stores different threshold values (e.g., Tgr, Tr, Tb, Tgb) for each color channel (e.g., Gr, R, B, Gb). After receiving a block of pixels 714 in downscaled raw image 614, threshold circuit 616 compares values in these pixels with the threshold values. If the pixel value of a pixel exceeds a corresponding threshold value, one value (e.g., 1) is assigned to that pixel whereas if the pixel value does not exceed the corresponding threshold value, another value (e.g., 0) is assigned to that pixel. Such assigned values may be in the form of a matrix 718 as shown in FIG. 7 where each element in the matrix indicates whether a pixel value of a corresponding pixel exceeded the corresponding threshold. Matrix 718 is then sent to determination logic 620 as part of comparison result 618. Although pixels 714 and matrix 718 are 2×2 array, pixels and matrices of different dimensions may also be used (e.g., 8×8, 4×2, 2×4) by threshold circuit 616.

Determination logic 620 is a circuit that receives comparison result 618 and performs logic operations to determine whether a block of pixels indicates a bright spot that may generate a green ghost. Specifically, determination logic 620 may apply AND logic, OR logic, a combination of AND/OR logic to matrix 718 or tally the number of a certain value (e.g., 1) in matrix 718 to determine if block of pixels 714 indicate the bright spot. For example, AND logic is applied so that the block of pixels 714 is identified in bright light information 520 as a bright spot only if all the elements in matrix 718 are of a certain value (e.g., 1). Alternatively, OR logic may be applied instead so that block of pixels 714 is identified in bright light information 520 as a bright spot if at least one of the elements in matrix 718 is of a certain value (e.g., 1). Still further, determination logic 620 may determined that block of pixels 714 indicate the bright spot if three or more of elements in matrix 718 are of a certain value (e.g., 1). Determination logic 620 generates the results of a single bit for each block of the pixels as bright light information 520. By reducing the number of bits to represent the bright spot, bright light information 520 takes up smaller memory space and also is processed more efficiently. Bright light information 520 may be stored in system memory 230 or be sent to subsequent pipeline in ISP 206 for removal or alleviation of the green ghost caused by the detected bright spot.

Flare detection circuit 518 illustrated in FIG. 6 is merely illustrative. Flare detection circuit 518 may include additional circuits or lack certain circuits (e.g., scaler circuit 612).

Example Process of Green Ghost Detection

Figure 8:
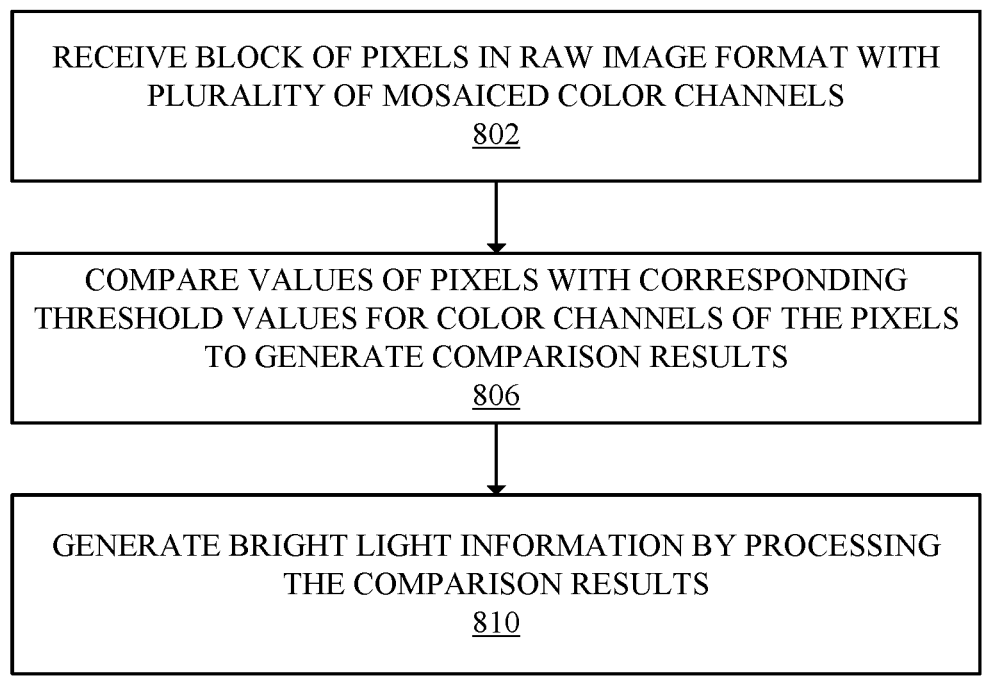
FIG. 8 is a flowchart illustrating a process of detecting locations of the green orb or the green ghost, according to one embodiment.

FIG. 8 is a flowchart illustrating a process of detecting locations of the green ghost, according to one embodiment. A block of pixels (e.g., pixels 714) in a raw image format with a plurality of mosaiced color channels (e.g., Gr, R, Gb, B) is received 802. The block of pixels may be processed from an image in a raw format (e.g., processed version 516 of raw image) and may have underwent processing such as downscaling. The raw format may be, for example, Bayer raw image format.

The values of the pixels are compared 806 with corresponding threshold values of corresponding color channels to generate comparison results (e.g., matrix 718). The threshold values may be set by CPU 208 executing software. The comparison results may indicate whether each pixel in the block exceeded a threshold for the corresponding color channel.

The bright light information is generated 810 by processing the comparison results. The processing may include performing predetermined logic operations (e.g., AND operation, OR operation, etc.) on the comparison results. The bright light information indicates whether a lens flare is likely to be present at a location of an image.

The process described with reference to FIG. 8 is merely illustrative. Additional steps may be performed as part of the process (e.g., scaling of the raw image) or certain steps may be omitted or performed in parallel with other steps.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A circuit, comprising:
   a threshold circuit configured to:
      receive a block of pixels corresponding to a first location of an image in a raw image format, wherein the block of pixels comprises a plurality of mosaiced color channels, and
      for each pixel of the block of pixels, compare a value of the pixel of the block of pixels with a threshold value corresponding to a mosaiced color channel of the plurality of mosaiced color channels to generate a comparison result; and
   a logic circuit coupled to the threshold circuit, and configured to generate light information by processing the comparison result generated for each pixel of the block of pixels, the light information indicating whether an artifact is likely to be present at a second location of the image that is diagonally opposite to the first location relative to an optical center of an image sensor that captured the image.

2. The circuit of claim 1, wherein the raw image format is a Bayer image format.

3. The circuit of claim 1, wherein the comparison result has a first value or a second value, the first value indicating that the value of the pixel of the block of pixels exceeds the threshold value and the second value indicating that the value of the pixel of the block of pixels does not exceed the threshold value.

4. The circuit of claim 3, wherein the light information has the first value or the second value, the first value of the light information indicating that the artifact is likely to be present at the second location, and the second value of the light information indicating that the artifact is unlikely to be present at the second location.

5. The circuit of claim 1, further comprising a scaler circuit configured to downscale the image in the raw image format to generate the block of pixels.

6. The circuit of claim 1, wherein the circuit is upstream of at least a correction circuit or a gain circuit, the correction circuit configured to perform lens shade correction on the image and the gain circuit configured to apply white balancing gain on the image.

7. The circuit of claim 1, wherein a first value of a first pixel of the block of pixels is compared to a first threshold value corresponding to a first mosaiced color channel of the plurality of mosaiced color channels, and wherein a second value of a second pixel of the block of pixels is compared to a second threshold value corresponding to a second mosaiced color channel of the plurality of mosaiced color channels, wherein the first threshold value is different from the second threshold value.

8. A method, comprising:
   receiving a block of pixels corresponding to a first location of an image in a raw image format, wherein the block of pixels comprises a plurality of mosaiced color channels;
   for each pixel of the block of pixels, comparing a value of the pixel of the block of pixels with a threshold value corresponding to a mosaiced color channel of the plurality of mosaiced color channels to generate a comparison result; and
   generating light information by processing the comparison result generated for each pixel of the block of pixels, the light information indicating whether an artifact is likely to be present at a second location of the image that is diagonally opposite to the first location relative to an optical center of an image sensor that captured the image.

9. The method of claim 8, wherein the raw image format is a Bayer image format.

10. The method of claim 8, wherein each of the comparison result has a first value or a second value, the first value indicating that the value of the pixel of the block of pixels exceeds the threshold value and the second value indicating that the value of the pixel of the block of pixels does not exceed the threshold value.

11. The method of claim 10, wherein the light information has the first value or the second value, the first value of the light information indicating that the artifact is likely to be present at the second location, and the second value of the light information indicating that the artifact is unlikely to be present at the second location.

12. The method of claim 8, further comprising downscaling the image in the raw image format to generate the block of pixels.

13. The method of claim 8, further comprising at least one of performing lens shade correction or applying white balancing gain on the image after generating the light information.

14. The method of claim 8, wherein a first value of a first pixel of the block of pixels is compared to a first threshold value corresponding to a first mosaiced color channel of the plurality of mosaiced color channels, and wherein a second value of a second pixel of the block of pixels is compared to a second threshold value corresponding to a second mosaiced color channel of the plurality of mosaiced color channels, wherein the first threshold value is different from the second threshold value.

15. An electronic device, comprising:
an image sensor; and
an image signal processor coupled to the image sensor and configured to receive a raw image from the image sensor, the image signal processor comprising:
a comparison circuit, comprising:
a threshold circuit configured to:
receive a block of pixels corresponding to a first location of an image in a raw image format, wherein the block of pixels comprises a plurality of mosaiced color channels, and
for each pixel of the block of pixels, compare a value of the pixel of the block of pixels with a threshold value corresponding to a mosaiced color channel of the plurality of mosaiced color channels to generate a comparison result; and
a logic circuit coupled to the comparison circuit and configured to generate light information by processing the comparison result generated for each pixel of the block of pixels, the light information indicating whether an artifact is likely to be present at a second location of the image that is diagonally opposite to the first location relative to an optical center of the image sensor.

16. The electronic device of claim 15, wherein the comparison result has a first value or a second value, the first value indicating that the value of the pixel of the block of pixels exceeds the threshold value and the second value indicating that the value of the pixel of the block of pixels does not exceed the threshold value.

17. The electronic device of claim 16, wherein the light information has the first value or the second value, the first value of the light information indicating that the artifact is likely to be present at the second location, and the second value of the light information indicating that the artifact is unlikely to be present at the second location.

18. The electronic device of claim 15, wherein the image signal processor further comprises a correction circuit configured to perform lens shade correction on the image and a gain circuit configured to apply white balancing gain on the image, the correction circuit and the gain circuit located downstream relative to the comparison circuit in the image signal processor.

19. The electronic device of claim 15, further comprising a central processor unit configured to execute software for removing the artifact from the image based on the light information.

20. The electronic device of claim 15, wherein a first value of a first pixel of the block of pixels is compared to a first threshold value corresponding to a first mosaiced color channel of the plurality of mosaiced color channels, and wherein a second value of a second pixel of the block of pixels is compared to a second threshold value corresponding to a second mosaiced color channel of the plurality of mosaiced color channels, wherein the first threshold value is different from the second threshold value.

* * * * *

UNITED STATES PATENT AND TRADEMARK OFFICE
CERTIFICATE OF CORRECTION

| | | |
|---|---|---|
| PATENT NO. | : 12,267,601 B2 | Page 1 of 1 |
| APPLICATION NO. | : 18/114602 | |
| DATED | : April 1, 2025 | |
| INVENTOR(S) | : Wang | |

It is certified that error appears in the above-identified patent and that said Letters Patent is hereby corrected as shown below:

On the Title Page

Column 2, Item (74), in "Attorney, Agent, or Firm", Line 2, delete "P.L.L.C" and insert -- P.L.L.C. --, therefor.

In the Claims

In Column 16, Claim 4, Line 23, delete "location," and insert -- location --, therefor.

In Column 16, Claim 10, Line 62, after "wherein" delete "each of".

Signed and Sealed this
Twentieth Day of May, 2025

Coke Morgan Stewart
*Acting Director of the United States Patent and Trademark Office*